US009649724B2

(12) United States Patent
Oh et al.

(10) Patent No.: US 9,649,724 B2
(45) Date of Patent: May 16, 2017

(54) CHARGING DEVICE OF A WELDING FIXTURE OF SPACER GRID

(71) Applicant: KEPCO NUCLEAR FUEL CO., LTD., Daejeon (KR)

(72) Inventors: Byeong Eun Oh, Daejeon (KR); Kwang Ho Yun, Daejeon (KR); Dong Kwang Shin, Daejeon (KR); Heui Seob Yang, Daejeon (KR); Sang Jae Han, Daejeon (KR); Jong Sung Hong, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 413 days.

(21) Appl. No.: 14/738,030

(22) Filed: Jun. 12, 2015

(65) Prior Publication Data
US 2016/0151858 A1    Jun. 2, 2016

(30) Foreign Application Priority Data

Nov. 27, 2014    (KR) ........................ 10-2014-0167364

(51) Int. Cl.
*B23K 26/08*    (2014.01)
*B23K 37/04*    (2006.01)
*B23Q 1/25*    (2006.01)
*G21C 3/34*    (2006.01)
*B23K 37/00*    (2006.01)
*B23K 37/02*    (2006.01)
(Continued)

(52) U.S. Cl.
CPC ........ *B23K 26/0853* (2013.01); *B23K 31/022* (2013.01); *B23K 37/00* (2013.01); *B23K 37/02* (2013.01); *B23K 37/0435* (2013.01); *B23K 2201/22* (2013.01); *B23Q 1/25* (2013.01); *G21C 3/34* (2013.01); *G21C 3/3424* (2013.01)

(58) Field of Classification Search
CPC .. B23K 26/0853; B23K 37/0435; B23Q 1/25; G21C 3/34; G21C 3/3424
USPC ....... 219/121.6, 121.63, 121.86; 269/37, 41; 228/44.3
See application file for complete search history.

(56) References Cited

U.S. PATENT DOCUMENTS

| 2,195,962 | A | * | 4/1940 | Hansen | ................. | B23K 9/121 |
| | | | | | | 219/124.5 |
| 5,343,508 | A | * | 8/1994 | Hatfield | ................. | G21C 3/332 |
| | | | | | | 376/449 |

(Continued)

FOREIGN PATENT DOCUMENTS

| JP | 2011-026099 A | 2/2011 |
| KR | 20-0169598 Y1 | 3/2000 |

(Continued)

*Primary Examiner* — Samuel M Heinrich
(74) *Attorney, Agent, or Firm* — Rabin & Berdo, P.C.

(57) ABSTRACT

A charging device of a welding fixture of spacer grid comprises a base frame; a conveyor for conveying a welding fixture horizontally over the base frame; and a gripper located over the base frame for gripping a welding fixture conveyed along the conveyor to charge a welding fixture into a welding chamber, wherein the gripper comprises a gripper body; and a gripping part installed horizontal to the end of the gripper body for gripping a welding fixture and capable of tilting in vertical direction to the gripper body in case more than a predetermined load is applied as a vertical load.

10 Claims, 7 Drawing Sheets

(51) Int. Cl.
*B23K 31/02* (2006.01)
*B23K 101/22* (2006.01)

(56) References Cited

U.S. PATENT DOCUMENTS

| | | | | |
|---|---|---|---|---|
| 5,406,599 A | * | 4/1995 | Johnson, Jr. | G21C 3/3424 |
| | | | | 219/158 |
| 6,575,444 B1 | * | 6/2003 | Bidaud | B23K 37/0443 |
| | | | | 269/152 |
| 6,637,737 B1 | * | 10/2003 | Beecherl | B23Q 1/5406 |
| | | | | 269/289 R |
| 6,943,315 B2 | * | 9/2005 | Cho | B23K 37/0235 |
| | | | | 219/117.1 |

FOREIGN PATENT DOCUMENTS

| | | |
|---|---|---|
| KR | 10-0922162 B1 | 10/2009 |
| KR | 10-0952183 B1 | 4/2010 |
| KR | 10-2012-0092289 A | 8/2012 |

* cited by examiner

CHARGING DEVICE OF A WELDING FIXTURE OF SPACER GRID

BACKGROUND OF THE INVENTION

Field of the Invention

The present invention relates to a charging device of a welding fixture of spacer grid.

Description of the Related Art

Generally, a nuclear reactor is equipment that is made to control nuclear fission artificially to generate heat, or to be used for various purposes such as production of radioisotope or plutonium, or radiation filed formation, etc.

In general, light water reactor nuclear power plant uses enriched uranium in which ratio of uranium-235 is increased by 2 to 5%. For nuclear fuel to be used in nuclear reactors, fuel fabrication is processed in such a way that cylindrical pellet hefting about 5 g is made of uranium. In order to manufacture a fuel rod, these pellets come charging zircaloy cladding and spring and helium gas are put in and then an end plug is welded in a rod end. The fuel rods are charged in skeleton finally to form a fuel assembly and combusted by nuclear reaction in the nuclear reactor.

Spacer grid in nuclear fuel assembly which forms skeleton with a fuel rod, instrument tube, and guide tube, is made by dozens of spacer grid straps. Each spacer grid strap has a plurality of incision parts such as a slot. Spacer girds are placed longitudinally and laterally at regular interval so that spacer grids cross each other respectively. Thus incision parts are interconnected to each other by fitting to each other so that spacer grid forms grid space.

However these spacer grid straps are interconnected to each other by inserting into incision parts, spacer grid itself sways because of gaps in most incision parts. Thus the points of intersection where spacer grids cross each other, and parts in which connection is not solid such as outside, corner, etc. are welded in order to prevent spacer grids from swaying. Laser welding is mostly used for the welding method of spacer grid.

For example, the present applicant's Korean Patent No. 10-0922162 (registered on 9 Oct. 2009) suggests a laser welding device for spacer grid of nuclear fuel assembly for enhancing workability and productivity.

In the laser welding device for spacer grid, spacer grid straps before welding are temporarily assembled and then are assembled with a welding fixture comprising a plurality of lateral plates, upper and lower support plates in order to be supported, and then welding is operated.

As another embodiment, the present applicant's Korean Patent No. 10-0952183 (registered on 2 Apr. 2010) suggests an apparatus for loading and unloading automatically welding fixture to charge a welding fixture into a welding chamber and withdraw a welded spacer grid automatically.

DOCUMENTS OF RELATED ART (Patent Document 1) Korean Patent No. 10-0922162 (registered on 9 Oct. 2009)
(Patent Document 2) Korean Patent No. 10-0952183 (registered on 2 Apr. 2010)

SUMMARY OF THE INVENTION

Accordingly, the present invention is for providing a charging device of a welding fixture to allow charging a welding fixture in a welding chamber for a laser welding apparatus for spacer grid.

The charging device of a welding fixture of spacer grid as an apparatus for charging a welding fixture of spacer grid in a welding chamber according to the present invention for accomplishing these objects comprises a base frame; a conveyor for conveying a welding fixture horizontally over the base frame; and a gripper located over the base frame for gripping a welding fixture conveyed along the conveyor. And the gripper comprises a gripper body; and a gripping part installed horizontal to the end of the gripper body for gripping a welding fixture, and capable of tilting in vertical direction to the gripper body in case a vertical load applied is heavier than a predetermined load.

Preferably the gripper body and the gripping part in which an elastic body is inserted according to the present invention are connected by at least two (2) or more than two (2) connector pins placed at different levels.

Preferably, a spacer of width identical to separation distance is arranged between the gripper body and the gripping part.

Preferably, a plurality of loading guide cylinders is arranged in a row along the conveyor in at least more than three (3) locations where a welding fixture is seated duly. Preferably, at least one of the said loading guide cylinders is placed outside the conveyor.

Preferably, the gripper body according to the present invention is arranged in such a way that at least more than two of holes are placed at different levels to form a long through hole in vertical direction, and the gripping part comprises a guide rail arranged transversely; a pair of grip arms slidable from side to side along the guide rail; a connector pin protruded corresponding to the through hole; an elastic body for supporting the gripper body and the gripping part elastically by being inserted in the connector pin; a spacer arranged between the gripper body and the gripping part; and a grip mechanism for driving the grip arm horizontally from side to side.

Preferably, the grip mechanism according to the present invention comprises a driving cylinder arranged between the grip arms for driving the grip arm horizontally; a rotation plate rotatable around a fixed rotation axis; a pair of rotatable arms of which one end is assembled to the rotation plate by a hinge and the other end is assembled to each grip arm by a hinge.

Preferably, the rotation plate has its rotation axis fixed to a cover plate arranged over the grip arm, and further comprises a proximity sensor for detecting change of separation distance between the gripper body and the gripping part.

The present invention has the following advantages. The charging device of a welding fixture of spacer grid according to the present invention has the effect to increase workability and productivity by automating charging and withdrawing a welding fixture in a welding chamber, and prevent damage of a welding fixture by preventing overload which can happen to a gripper while withdrawing a welding fixture.

And also the present invention separates the position of a welding fixture before and after welding into a plurality of positions and a welding fixture before and after welding can be transferred on a single conveyor line in both directions. Thus welding operation can be efficiently achieved.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Specific configurations or functional descriptions which set forth in exemplary embodiments according to the present invention are only for the purpose of describing exemplary embodiments, and the exemplary embodiments according to the concept of the present invention can be practiced in various forms. Thus the present invention is not limited to the described exemplary embodiments and all of appropriate variations, modifications and equivalents are considered to pertain to the scope of the present invention.

The terms used in this specification are only for describing the specific exemplary embodiment, not meat to limit the present invention. The singular expression implies both singular and plural meaning unless it is distinctly different by context.

Specific exemplary embodiment of the present invention will be explained from the following detailed description when taken in conjunction with the accompanying drawings as follows.

Figure 1:
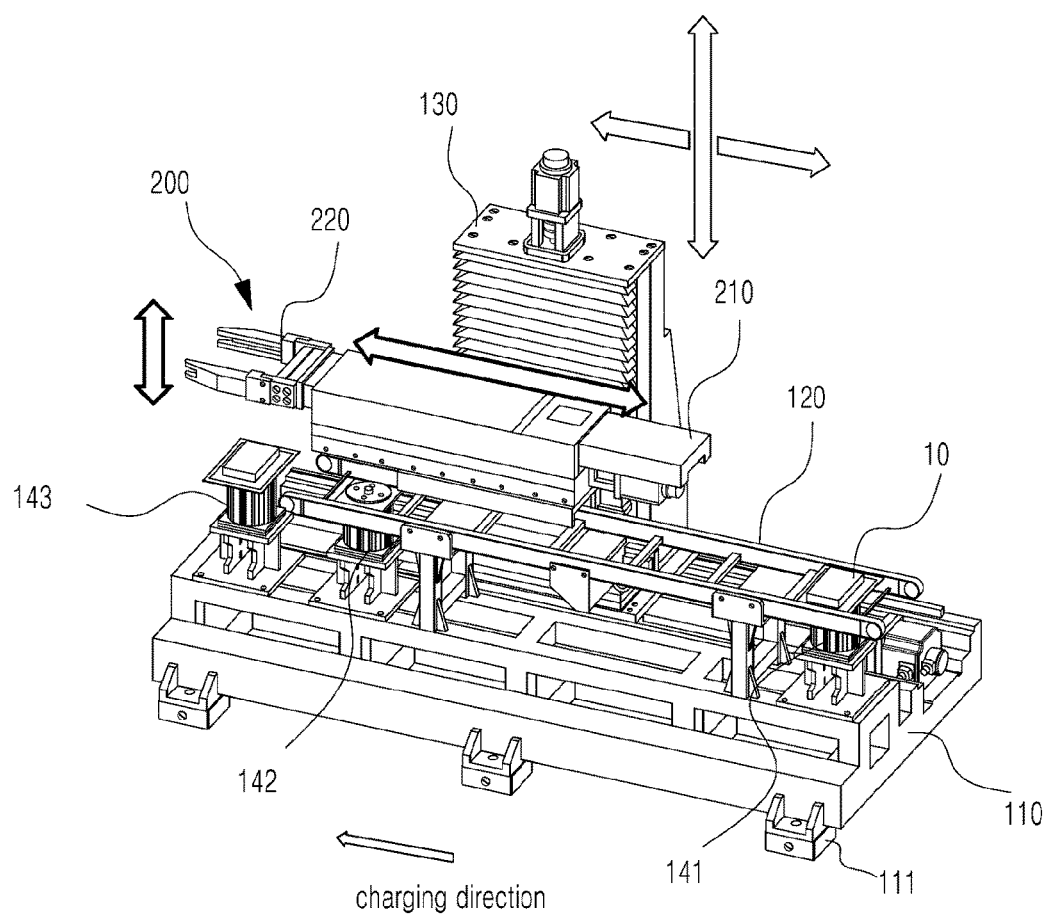
FIG. 1 illustrates a perspective view of a charging device of a welding fixture of spacer grid according to the present invention.

As illustrated in FIG. 1, a charging device of a welding fixture of spacer grid according to the present invention comprises a base frame 110; a conveyor 120 for conveying a welding fixture 10 horizontally over the base frame 110; and a gripper 200 located over the base frame 110 for gripping a welding fixture 10, and charging a welding fixture 10 in a welding chamber (which is not illustrated) or withdrawing a welding fixture 10 with which welding is completed in a welding chamber.

The base frame 110 can be provided as a rectangular block, and a conveyor 120 and a gripper 200 are located above.

An adjustment block 111 can be arranged in the lower part of the base frame 110, level or alignment of transverse position of the base frame 110 can be adjusted by fine adjustment of the adjustment block 111.

A conveyor 120 is installed in longitudinal direction of a base frame 110, and conveys a welding fixture 10 horizontally. Preferably, the conveyor 120 is driven by a two-way motor which can drive in normal and reverse directions.

A gripper 200 grips a welding fixture 10 conveyed along the conveyor 120, charges the welding fixture 10 into a welding chamber, and withdraws the welding fixture 10 with which welding is completed in a welding chamber.

A gripper 200 is installed in such a way that it is supported by a transfer block 130 movable back and forth in longitudinal direction of a base frame 110. And also a gripper 200 is arranged to be movable up and down for the transfer block 130. Thus, the gripper 200 can be moved horizontally or vertically.

For example, the transfer block 130 can be moved back and forth by the base frame 110 and a well-known linear actuator such as LM guide. Also a separate linear actuator is arranged vertically to the transfer block 130 for the gripper 200. Thus, the position of the gripper 200 can be freely changed in horizontal direction or vertical direction by two linear actuators' control.

Preferably, a conveyor 120 can be divided by in/out position, forward position, and waiting position in charging direction on the conveyor according to the location of a welding fixture before and after welding operation. And more preferably, loading parts 141, 142, 143 can be installed in each position, and interlocked with a gripper 200 to transfer a welding fixture. At this time, loading parts 141, 142, 143 are the positions in which a welding fixture is placed. And a welding fixture can be raised higher than the conveyor 120 level from the position, or on the contrary a welding fixture can be settled on the conveyor 120.

In this exemplary embodiment, loading parts 141, 142, 143 are illustrated as first loading guide cylinder 141, second loading guide cylinder 142, and third loading guide cylinder 143 for moving a welding fixture vertically. But the first loading guided cylinder 141 in which a welding fixture is early settled and placed can be replaced by position detection sensor with a welding fixture transferred by another transferring equipment (not illustrated). First loading guide cylinder 141 is taken for an example for the following description.

Preferably, first loading guide cylinder 141 and second loading guide cylinder 142 can be placed in each end of the section, the third loading guide cylinder 143 is adjacent to a welding chamber and placed outside a conveyor 120.

Thus, according to working condition the location of a welding fixture is divided and a welding fixture is supplied. Supply and withdrawal of a welding fixture can be efficiently performed with a single conveyor, which will be described again with the relevant drawings (FIGS. 6A-6D and FIGS. 7A-7D).

Particularly, the gripper 200 according to the present invention comprises a gripper body 210; and a gripping part 220 installed horizontally to the end of the gripper body 210 for gripping a welding fixture, and capable of tilting in vertical direction to the gripper body 210 in case a vertical load applied is heavier than a predetermined load.

In general, a welding fixture has a plurality of fixed holes, and a welding rotation plate of a welding chamber where a welding fixture is placed has a guide pin corresponded to a fixed hole. Thus a welding fixture is charged into a welding chamber, and then a fixed hole is inserted by a guide pin so that a welding fixture can be settled. In order to guide precise settlement location of a welding fixture, a fixed hole of a welding fixture and a guide pin of a welding plate allow only small separation distance. Thus, while withdrawing a welding fixture in a welding chamber after welding is completed, a fixed hole of a welding fixture may not be easily separated from a guide pin. If a gripper forcibly raises a welding fixture then, the welding fixture or the gripper can be damaged.

Thus, in case vertical load heavier than set-up load is applied to a gripping part 220 for a gripper body 210, a means is arranged to stop the gripping part 220 moving up or down in the present invention.

Figure 2:
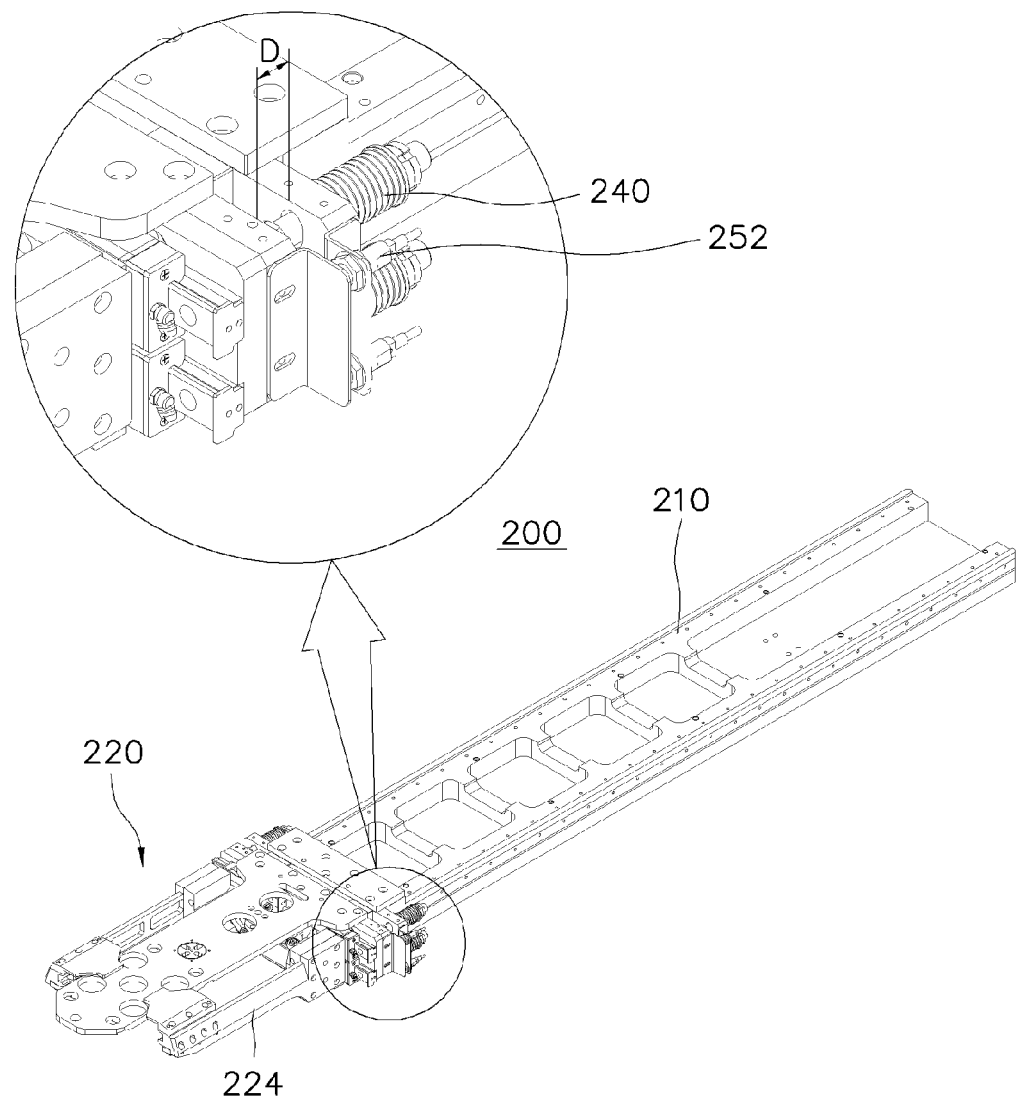
FIG. 2 illustrates a perspective view of a gripper according to the charging device of a welding fixture of spacer grid according to the present invention.
Figure 3:
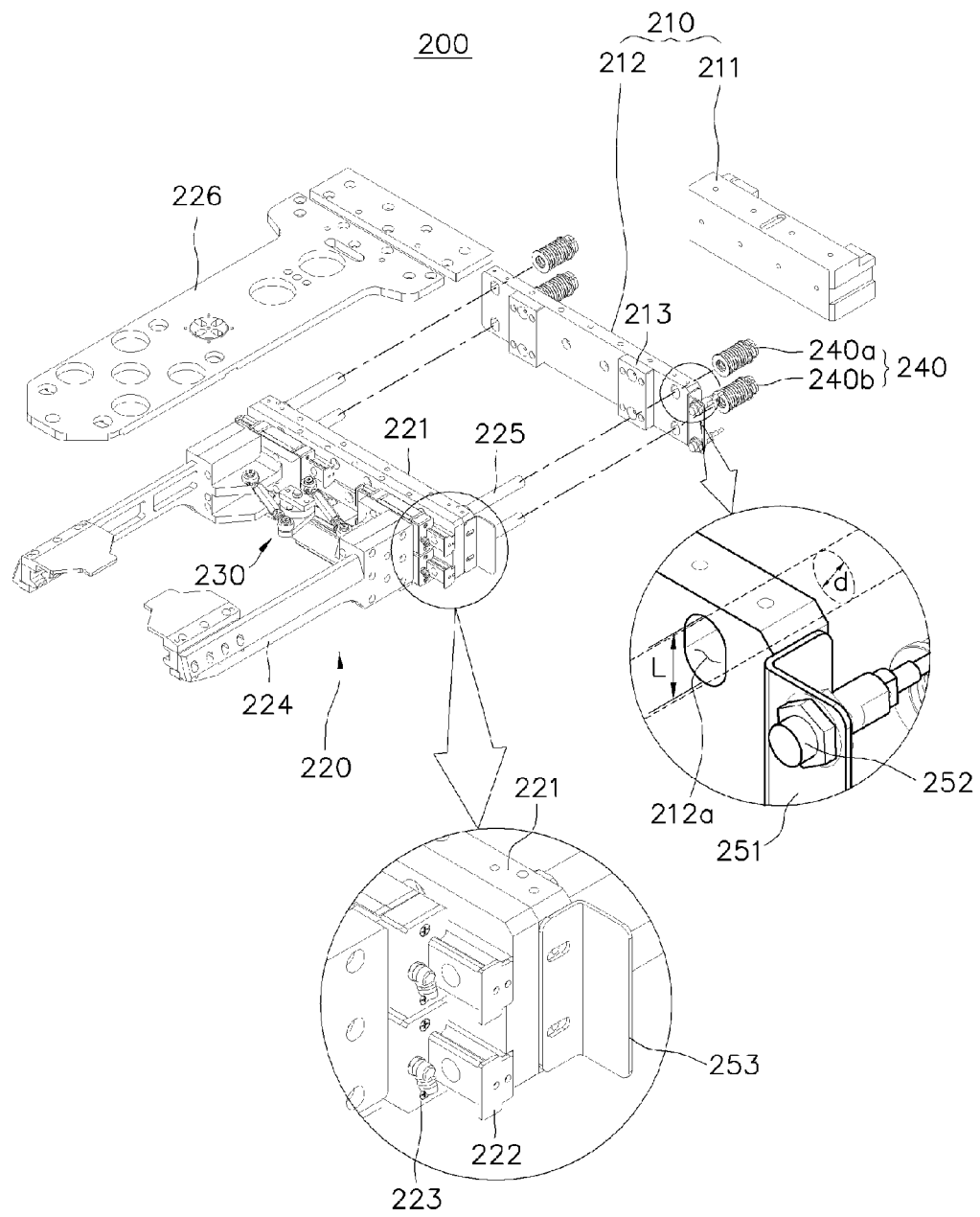
FIG. 3 illustrates an exploded view of a part of a gripper according to the charging device of a welding fixture of spacer grid according to the present invention.

Specifically, with reference to FIG. 2 and FIG. 3, a gripper body 210 comprises a body rail 211, and a body plate 212 fixed to the end of the body rail 211. A body plate 212 has a through hole 212a in each corner and a spacer 213 is arranged in between. Thus a gripper body 210 and a gripping part 220 are assembled with constant distance (D) away from each other.

The gripping part 220 comprises a grip plate 221, a guide rail 222 transversely fixed to the front side of a grip plate 221, a pair of driving blocks 223 arranged to be horizontally moveable along the guide rail 222, a pair of grip arms 224 fixed to each driving block 223 for gripping a welding fixture, a connector pin 225 protruded corresponding to the through hole 212a in the back side of a grip plate 221, and a grip mechanism 230 for driving horizontally a driving block 223 in leftward and rightward directions.

Preferably, a through hole 212a is a long hole in vertical direction, the length, L, in vertical direction is longer than d, the width of a connector pin 225. Thus, the gripper body 210 and the gripping part 220 assembled by the connector pin 225 can be moved in vertical direction within a range of the vertical length of the through hole 212a.

The connector pin 225 of the gripping part 220 penetrates the through hole 212a of the body plate 212, a spring 240 is inserted, a washer and a nut are assembled to the end, and the gripper body 210 and the gripping part 220 are connected elastically. A screw thread can be formed at the end of the connector pin 225 in such a way that a nut can be assembled to the connector pin.

The gripper body 210 and the gripping part 220 are assembled by the connector pin 225 interposed by the spring 240.

As the spring 240 is compressed for more than constant load, the gripping part 220 is tilted up or down. At this time, the set-up load for which the gripping part 220 becomes tilted can be determined by the elastic coefficient of the spring 240 assembled to the connector pin 225.

However in this exemplary embodiment, a driving block 223 and a grip arm 224 are illustrated as separate configurations, the grip arm can be directly attached to the guide rail in such a way that the grip arm can be slided from side to side.

Preferably, a proximity sensor can be further added for detecting the change of separation distance between a gripper body 210 and a gripping part 220. In this exemplary embodiment, the proximity sensor 252 is fixed to the fixed bracket 251 assembled to the lateral side of the body plate 212 by a screw. Corresponding to this, screen bracket 253 is installed in the lateral side of the grip plate 221, and the proximity sensor 252 detects the distance from the screen bracket 253. Thus the separation distance between the gripper body 210 and the gripping part 220 can be detected. This proximity sensor can be provided by a well-known sensor which outputs ultrasonic wave or optical signal and detects the distance by detecting the reflected signal.

Figure 4:
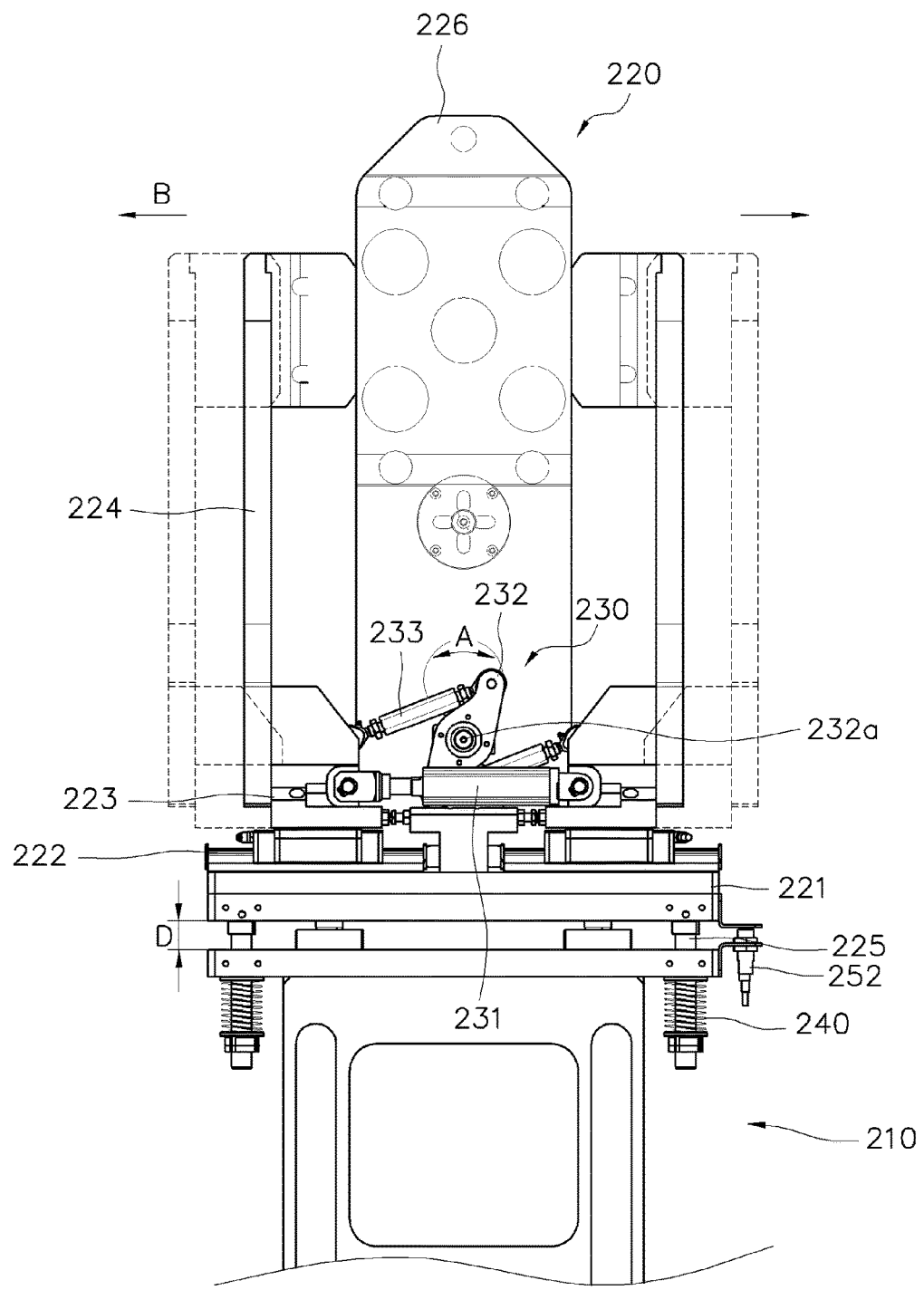
FIG. 4 illustrates a bottom view of a part of a gripper according to the charging device of a welding fixture of spacer grid according to the present invention.

FIG. 4 is a bottom view of a part of a gripper according to the charging device of a welding fixture of spacer grid according to the present invention. With reference to FIG. 4, a grip mechanism 230 for driving a grip arm 224 from side to side comprises a driving cylinder 231 arranged between a pair of driving blocks 223 which can be moved horizontally along a guide rail 222 fixed in front of the grip plate 221 for driving a driving block 223, a rotation plate 232 rotatable around a fixed rotation axis 232a, a pair of rotatable arms 233 of which one end is assembled to the rotation plate 232 by a hinge and the other end is assembled to each driving block 223 by a hinge.

A rotation axis 232a of the rotation plate 232 is supported by a cover plate 226 assembled over a grip plate 221 in such a way that the rotation plate 232 can be rotated.

In this grip mechanism 230, transverse movement of the driving block 223 is achieved by the driving cylinder 231, wherein an rotatable arm 233 attached to the driving block 223 assists transverse movement of the driving block 223 with the rotation plate 232 rotating (arrow sign A) so that a longer grip arm 224 can be moved smoothly from side to side (arrow sign B).

Figure 5:
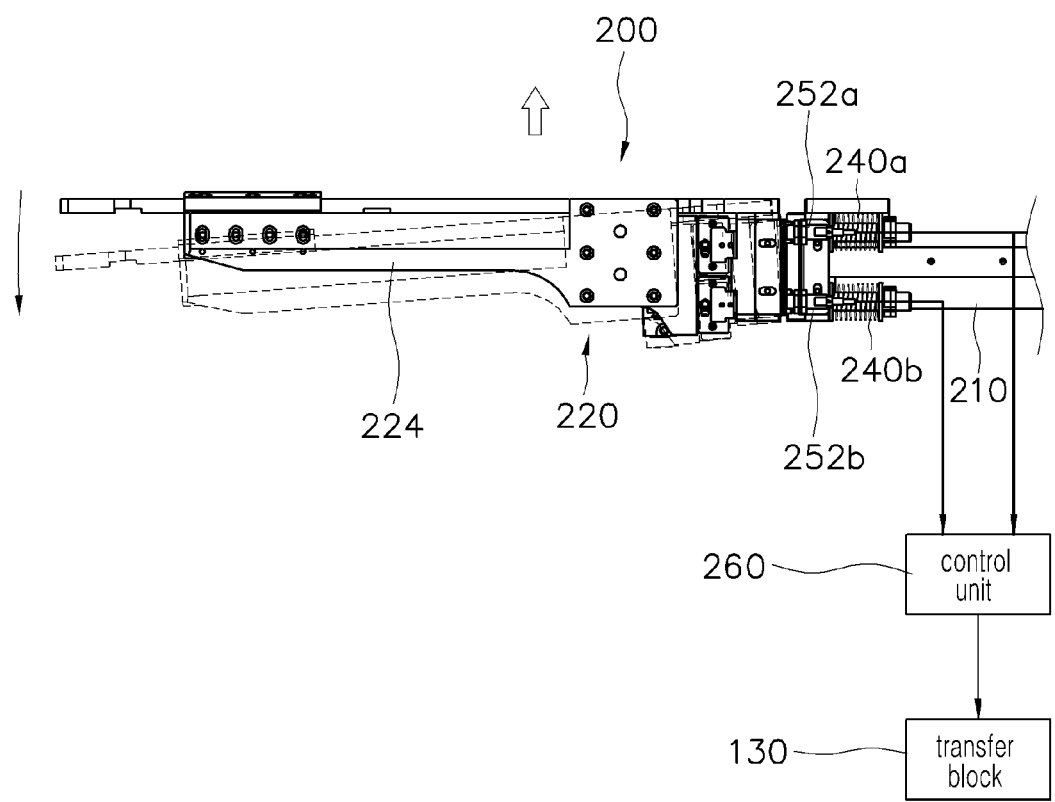
FIG. 5 illustrates a side view of a gripper according to the charging device of a welding fixture of spacer grid according to the present invention.

FIG. 5 illustrates a side view of a gripper according to the charging device of a welding fixture of spacer grid according to the present invention, uses the same reference numerals for more than one configuration of the same, but uses first-, second- in front of constitutional element and describes by using a, b at the end of corresponded reference numeral to tell them apart.

In reference with FIG. 5, operation example of a gripper 200 is described as follows.

In case a welding fixture will not be detached from the welding rotation plate during the process that a gripper 200 grips a welding fixture and withdrawal (lifting operation) is performed after a welding fixture is settled on a welding rotation plate inside a welding chamber and welding is completed, first spring 240a and second spring 240b are respectively pulled and compressed so that a grip arm 224 is tilted down with the welding fixture for a body rail 211. Thus, overload of the driving part for lifting the gripper body 210 is prevented, and damage to the welding fixture and gripping part which may be caused by applying too much load to the welding fixture and the gripping part can be prevented.

On the one hand, distance between a gripper body 210 and a gripping part 220 is detected by first proximity sensor 252a and second proximity sensor 252b during tilting operation of a grip arm 224. The detection signal of first proximity sensor 252a and second proximity sensor 252b is transmitted to a control unit 260. And the control unit 260 stops lifting operation of a transfer block 130.

On the other hand, in case that a welding fixture is lowered when it is not precisely assembled to a welding rotation plate, a grip arm 224 is lifted for a gripper body 210 on the contrary to FIG. 5. Thus, overload can be prevented.

FIGS. 6A-6D and FIGS. 7A-7D illustrate diagrams showing operational example of the charging device of a welding fixture of spacer grid according to the present invention. FIGS. 6A-6D show the procedure that another welding fixture is transferred to the waiting position while one welding fixture proceeds welding inside a welding chamber. And FIGS. 7A-7D show the procedure that a welding fixture after welding is withdrawn and a welding fixture in the waiting position is charged into a welding chamber.

In FIGS. 6A-6D and FIGS. 7A-7D, A is a welding fixture with which welding is completed, B is a welding fixture with which welding is not done yet. Hereinafter they are called first welding fixture, A and second welding fixture, B respectively.

Figure 6A:
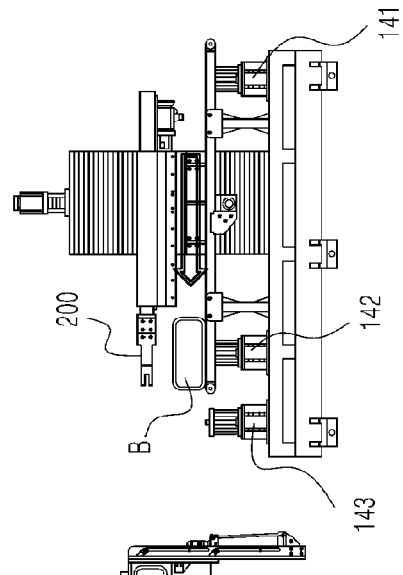
FIG. 6A is showing an operational example of the charging device of a welding fixture of spacer grid according to the present invention.

In reference with FIG. 1 and FIG. 6A, while first welding fixture A is in process of welding, second welding fixture B is settled and positioned in first loading guide cylinder 141.

Figure 6B:
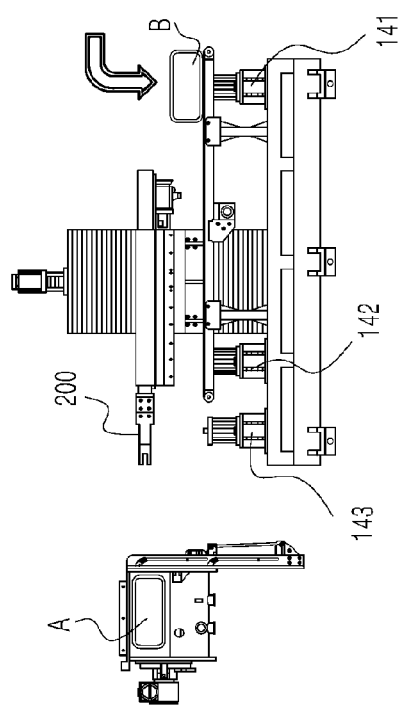
FIG. 6B is showing another operational example of the charging device of a welding fixture of spacer grid according to the present invention.
Figure 6C:
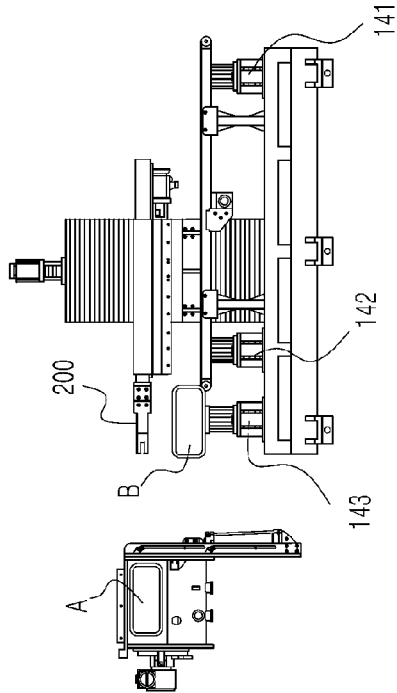
FIG. 6C is showing another operational example of the charging device of a welding fixture of spacer grid according to the present invention.
Figure 6D:
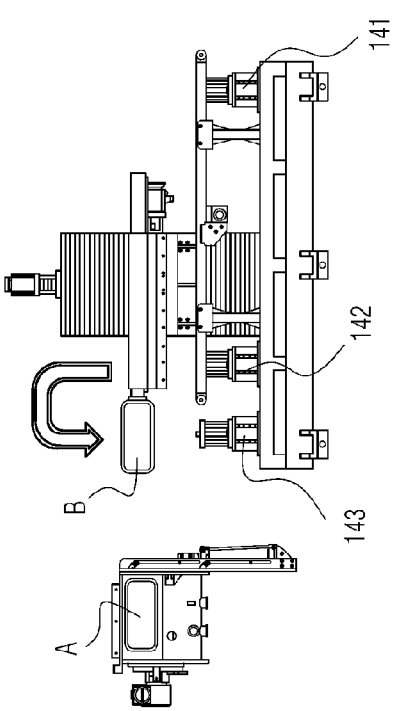
FIG. 6D is showing another operational example of the charging device of a welding fixture of spacer grid according to the present invention.

In FIG. 6B, second welding fixture B is moved to forward position, i.e. second guide cylinder 142. In FIGS. 6C and 6D, second welding fixture B located in second loading guide cylinder 142 will be transferred to in/out position, i.e. third loading guide cylinder by a gripper 200, and waits.

Figure 7A:
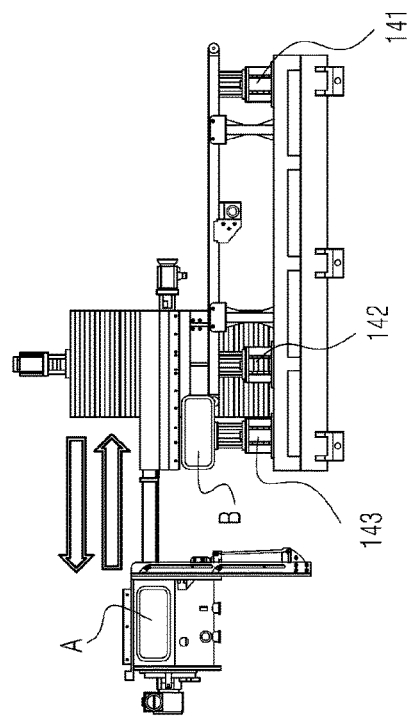
FIG. 7A is showing another operational example of the charging device of a welding fixture of spacer grid according to the present invention.
Figure 7B:
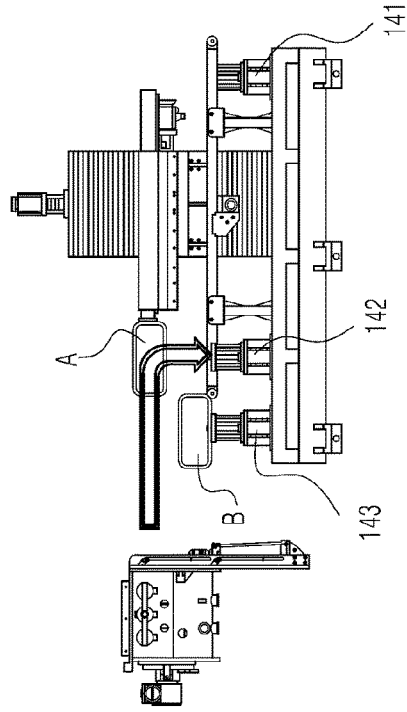
FIG. 7B is showing another operational example of the charging device of a welding fixture of spacer grid according to the present invention.

And then in reference with FIG. 1 and FIG. 7A, first welding fixture with which welding is finished is withdrawn by a gripper 200, the withdrawn first welding fixture A is settled in forward position, i.e. second loading guide cylinder 142, as shown in FIG. 7B.

Figure 7C:
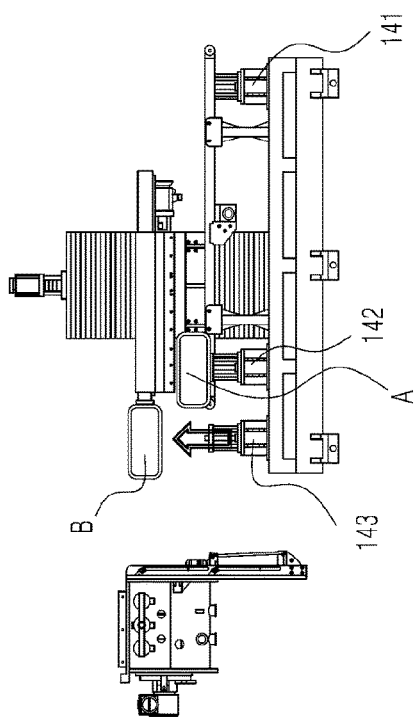
FIG. 7C is showing another operational example of the charging device of a welding fixture of spacer grid according to the present invention.
Figure 7D:
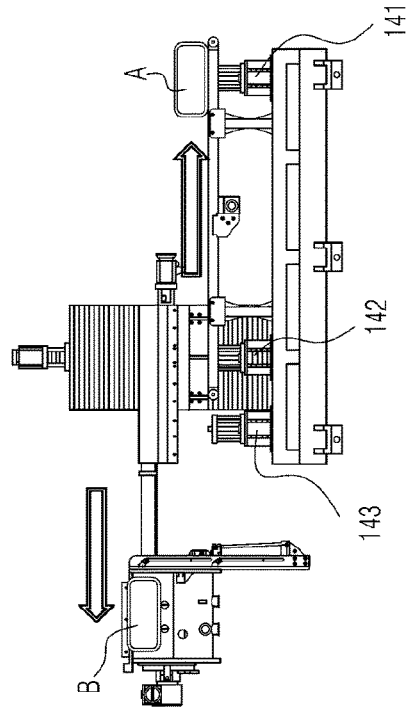
FIG. 7D is showing another operational example of the charging device of a welding fixture of spacer grid according to the present invention.

In FIG. 7C, second welding fixture B waiting next is charged in a welding chamber by a gripper 200, while first welding fixture A located in second loading guide cylinder 142 is transferred to first loading guide cylinder 141 along a conveyor 120, as shown in FIG. 7D.

In such order above, welding fixtures before or after welding can be charged in or withdrawn from a welding chamber along a single conveyor.

The present invention described above is not limited by the aforementioned embodiments and the accompanying drawings. It will be apparent to those who are skilled in the art that various substitutions, variations and modifications without departing from the scope of the spirit of the invention are possible.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A charging device of a welding fixture of spacer grid, comprising:
   a base frame;
   a conveyor for conveying a welding fixture horizontally over the base frame; and
   a gripper located over the base frame for gripping a welding fixture conveyed along the conveyor and charging it into a welding chamber, wherein the gripper comprises
   a gripper body; and
   a gripping part installed horizontal to the end of the gripper body for gripping a welding fixture, and capable of tilting in vertical direction to the gripper body in case more than a predetermined load is applied as a vertical load.

2. The charging device of a welding fixture of spacer grid according to claim 1, wherein the gripper body and the gripping part have an elastic body between them and are connected by at least two or more than two connector pins placed at different levels.

3. The charging device of a welding fixture of spacer grid according to claim 2, wherein a spacer of width identical to separation distance is arranged between the gripper body and the gripping part.

4. The charging device of a welding fixture of spacer grid according to claim 1, wherein a plurality of loading parts are arranged in a row along the conveyor in at least more than three (3) locations where a welding fixture is seated duly.

5. The charging device of a welding fixture of spacer grid according to claim 4, wherein at least one of the said loading parts is placed outside the conveyor.

6. The charging device of a welding fixture of spacer grid according to claim 1, wherein the gripper body is placed in such a way that at least more than two of them are placed at different levels to form a long through hole vertically, and the gripping part comprises a guide rail arranged transversely;
   a pair of grip arms slidable along the guide rail transversely;
   a connector pin protruded corresponding to the through hole;
   an elastic body inserted in the connector pin for supporting the gripper body and the gripping part elastically;
   a spacer arranged between the gripper body and the gripping part; and
   a grip mechanism for driving the grip arm horizontally from side to side.

7. The charging device of a welding fixture of spacer grid according to claim 6, wherein the grip mechanism according to the present invention comprises a driving cylinder arranged between the grip arms for driving the grip arm horizontally;
   a rotation plate having a fixed rotation axis and rotatable;
   a pair of rotatable arms of which one end each is assembled to the rotation plate by a hinge and the other end each is assembled to each grip arm by a hinge.

8. The charging device of a welding fixture of spacer grid according to claim 7, wherein the rotation plate has its rotation axis fixed to a cover plate arranged over the grip arm.

9. The charging device of a welding fixture of spacer grid according to claim 2 further comprises a proximity sensor for detecting change of separation distance between the gripper body and the gripping part.

10. The charging device of a welding fixture of spacer grid according to claim 6 further comprises a proximity sensor for detecting change of separation distance between the gripper body and the gripping part.

* * * * *